March 1, 1949.    L. NEEL    2,463,413
MANUFACTURE OF PERMANENT OXIDE MAGNETS

Filed April 17, 1945

```
SOLUTION OF FERROUS SALT AND COBALT SALT
                    │
                   COOL
                    ▼
FERROUS SALT CRYSTALS AND COBALT SALT CRYSTALS
                    │
                   HEAT BELOW 600°C. IN
                   OXIDIZING ATMOSPHERE
                    ▼
FINE POWDER OF IRON OXIDE AND COBALT OXIDE
                    │
                   AGGLOMERATE AT
                   TEMPERATURE BELOW 600°C.
                    ▼
AGGLOMERATED ARTICLE
                    │
                   MAGNETIZE
                    ▼
PERMANENT MAGNET
```

*INVENTOR.*
LOUIS NEEL

Patented Mar. 1, 1949

2,463,413

UNITED STATES PATENT OFFICE 2,463,413

MANUFACTURE OF PERMANENT OXIDE MAGNETS

Louis Néel, Grenoble, France, assignor to Societe d'Electro-Chimie, d'Electro-Metallurgie et des Acieries Electriques d'Ugine, Paris, France, a corporation of France Application April 17, 1945, Serial No. 588,766
In France August 21, 1943

Section 1, Public Law 690, August 8, 1946
Patent expires August 21, 1963

9 Claims. (Cl. 18—47.5)

It is already known to manufacture oxide magnets and more particularly iron and cobalt oxide magnets by starting from powders of said oxides mixing said powders and agglomerating them to the form desired for the magnet, thereafter submitting the so formed pieces to magnetic and thermic treatments such as will impart to them magnetic properties. The value of coercive force obtained with such mixtures of agglomerated powders only exceptionally exceeds 800 gausses and that of remanent specific magnetization $\sigma=59$ C. G. S.

This invention also relates to the use of iron and cobalt oxides for the manufacture of permanent magnets, but due to the method employed, this invention makes it possible to manufacture magnets in which the values of coercive force and of remanent magnetization correspond to magnets the qualities of which are clearly higher than those of the oxide magnets which have been obtained hitherto and this to such a degree that the characteristic properties of the so produced magnets reach values which are higher than those which can be obtained with the best presently known commercial magnets.

The method according to the present invention consists principally in submitting, in a known manner, a solution of ferrous iron and cobalt salts—decomposable into oxides by heating at a temperature lower than 600° C. in a neutral or oxidizing atmosphere—to a treatment, such as for instance, a cooling treatment, entailing a simultaneous precipitation or a syncrystallization of said salts from their solution, and then in decomposing the thus obtained crystals into oxides by heat in a neutral or oxidizing atmosphere and at a temperature lower than 600° C., the said decomposition being possibly followed by an oxidation by contact with an oxidizing atmosphere at a temperature lower than 600° C. until the mixture is saturated with oxygen, after which the thus obtained very finely divided oxide powder is agglomerated to the desired shape by any known means but at a temperature lower than 600° C., the agglomerated product being then magnetized, and possibly submitted to the usual thermic and magnetic treatments. The steps of this method are clearly illustrated by the drawing which is a flow sheet of applicant's method.

Owing to the simultaneous precipitation from a common solution of the iron and cobalt salts which can give rise to the oxides such as will form the magnets, one can obtain a mixture of the said constituents which is much more intimate than when two iron and cobalt salts are simply mixed in a pulverulent condition by usual mechanical methods as is the case for methods known hitherto.

The iron and cobalt salts which can be used for the execution of the method according to the invention must necessarily be decomposable by heat into oxides at comparatively low temperatures (lower than 600° C.) and give rise by this decomposition to very finely divided pulverulent products. Furthermore, they must be able to form syncrystals of iron and cobalt salts or very intimate mixtures of crystals thru precipitation from their solution. Such syncrystallisation is facilitated by selection of iron salts in which the iron is in a ferrous condition, thus having the same valence as cobalt in its commercial salts. Formates, acetates and oxalates yield particularly remarkable results. For these salts the decomposition must preferably be effected at temperatures between 300 and 500° C.

Ferric salts, as well as hydroxides, which are also decomposable to oxides at a low temperature yield much less good results.

In the U. S. patent application Ser. No. 585,398 the application of such salts to the manufacture of permanent magnets by means of powders has already ben described. A form of execution of the method described in that application consists in effecting also a syncrystallisation of the salts, which syncrystallisation is followed by a decomposition at a low temperature, but while, in that case, the decomposition is effected in a reducing atmosphere and possibly followed by a reduction for instance by means of hydrogen, so as to obtain the elements in a metallic condition, in the method according to the present invention one proceeds in order to obtain, instead of the metallic elements, oxides of such elements. For this reason, according to the invention, instead of effecting the decomposition of the salts in a reducing atmosphere, said decomposition is effected in a neutral or oxidizing atmosphere and followed, if necessary, by an oxidation.

It is essential that the decomposition of the salt should be effected without the salt passing over to a ferric condition. For this purpose it is advisable to protect the salt against oxidation before its decomposition and to begin with this decomposition in a neutral or slightly oxidizing atmosphere. Moreover the decomposition of the salt, as well as the subsequent oxidation, must be achieved at comparatively low temperatures, lower than about 600° C., preferably between 400 and 600° C. In fact the temperature of operation has an influence on the physical condition of the obtained powder and this physical condition reflects on the final properties of the magnet. In the case when an oxidation is achieved after the decomposition one must be careful to effect with caution this operation—which is exothermic in itself—so as to avoid any excessive elevation of temperature which would be likely to be prejudicial to the magnetic properties of the powder obtained by the decomposition and, owing to this fact, to diminish the advantages of the present method. Thus, for instance, one should preferably begin the process by proceeding to a slow oxidation either by operating at a sufficiently low temperature or by resorting to the intervention of a slightly oxidizing atmosphere; this results in creating on the surface of the grains an oxidized protecting surface which thereon prevents the acceleration of the oxidation reaction: once this layer is formed the oxidation can be carried on up to temperatures higher than 500° or 600° C., without any risk of even local overheatings, which overheatings it is essential to avoid.

One should endeavour, either through decomposition alone or through decomposition followed by oxidation, to reach the highest degree of oxidation which the mixture is capable to attain in the presence of air, at the temperature of the operation.

The decomposition and oxidation operations can be effected in the presence of any oxidizing atmosphere usually simply in the presence of air.

The above described series of operations gives rise to an exceedingly finely divided powder, this powder is then agglomerated, for instance by means of a binding agent or by simple compression without introducing any binding agent, in order to give it the shape which is desired for the magnet. But one must take care to effect this agglomeration at a low temperature and in any case in such a manner that the temperature of 600° C. shall never be exceeded.

In the course of the agglomeration one must endeavour to obtain as far as possible a high density, the remanence of the finished magnet growing as the density gets nearer to the theoretical density of the mixture in a massive condition. The agglomerated product is then magnetized.

The characteristic features of coercive field and remanence of thus manufactured magnets show a surprising difference with respect to those of magnets which have been manufactured directly from a mixture of two powders of iron and cobalt oxides even when these mixtures have been submitted to particular thermic treatments. The coercive force is roughly 4 to 5 times higher in the case of the method according to the invention. This extraordinary improvement can be ascribed to the condition of extreme fineness and of very high homogeneity in which the powder is obtained according to the said method. It is a remarkable fact that the thus manufactured magnets show characteristic properties which are higher than those of excellent magnets made of special steels.

Besides, the characteristic properties of thus obtained magnets can still be increased by submitting these magnets, or possibly the pulverulent product before agglomeration, to thermic treatments similar to those which are already used in the manufacture of permanent magnets and more particularly by submitting them to extended reheating at temperatures lower than 400° C. In this manner the coercive force can be increased by about 100% the remanent induction remaining unchanged.

Finally, it is also possible to increase the value of the remanence and to create a privileged direction in the magnet by reheating the agglomerate in a magnetic field; an effect is then produced which is similar to those which are known for certain magnetic alloys and certain oxide magnets. Thus, by a heating to 480° C. followed by a cooling in a magnetic field of 2.000 gausses the value of the remanence in a direction parallel to that of the field can grow from $\sigma R=40$ C. G. S. to $\sigma R=62$ C. G. S. The thus obtained magnet shows a permanent anisotropy by the fact that this privileged direction subsists ever afterwards whatever may be the magnetic treatment to which the magnet has been submitted, provided that this treatment is effected in a cold condition. Thus, for instance, if one tried to magnetize the magnet in a cold condition in a direction perpendicular to the privileged direction one would always obtain lower values for the remanence; if, on the contrary, after having been demagnetized, the magnet were submitted to new magnetized operations in different directions, it would always be in the privileged direction that the best results would be obtained.

By combining the two above mentioned treatments it is therefore possible to improve both the coercive force and the remanent induction of the product before it is treated and thus to reach exceedingly high values for these characteristic properties, as will be shown by examples given later on.

The results vary according to the nature of the initial salts and the treatments carried out during the manufacture, but they vary also according to the respective proportions of iron and cobalt oxide.

The following are a few examples of execution of the method according to the invention including indication of the principal characteristic features of the magnets which are obtained in each case.

*Example 1.*—One starts from a boiling saturated solution of iron and cobalt formates in diluted formic acid, in which the ratio Fe/Co is equal to 2. One allows to cool down to the surrounding temperature, thus a compound formate is precipitated in which the respective proportions of iron and cobalt are the same as in the solution. The moisture is removed and the obtained salts are dried while being preserved from oxidation. They are then heated to 400° C. in a furnace without any air circulation so as to achieve the decomposition and a beginning of oxidation; during this operation the powder is slightly stirred so that the reaction shall extend to the whole mass which is used. When the whole formate has been decomposed, i. e. after a few minutes a current of air of 1 litre per hour per gram of formate is established in order to complete the protecting oxidation; finally a current of air of 4 litres per hour per gram of formate is established during two hours. One thus obtains a black powder which can be agglomerated. This powder is agglomerated in the shape of small oblong bars under pressure of $10t$ per square centimetre in the presence of acetone.

The density of the resulting agglomerate is 3.8 gr. per cc.

The magnetic characteristic properties of the bar after magnetization are:

Remanent specific magnetization, $\sigma R = 40$ C. G. S.
Coercive force, $Hc = 2100$ gausses (field reducing the magnetization to zero).

Another bar agglomerated from the same powder was heated up to 460° C. in a strongly heat-insulated laboratory muffle-furnace in which it was allowed to cool down to the surrounding temperature. The cooling lasted about twenty hours.

After this treatment the magnetic characteristic properties of this magnet are:

$$\sigma R = 40$$
$$Hc = 4200$$

Therefore, the reheating has doubled the value of the coercive force, the remanence remaining unchanged.

A third bar prepared in the same way as the first one was put into the air-gap of a magnet, where a field of 2000 gausses prevailed; the whole bar and magnet was heated to 450° C. in a thoroughly heat-insulated furnace in which it was then allowed to cool slowly down to the surrounding temperature (cooling interval: about twenty hours). The bar had thus been submitted to a reheating operation in a magnetic field. Through this treatment it had acquired a magnetization in a privileged direction. The magnetic characteristic properties of the bar in this direction were:

$$\sigma R = 62$$
$$Hc = 4200$$

The reheating in a magnetic field has therefore increased the value of the remanent specific magnetization by about 50% in the direction of this field, the value of the coercive force remaining practically unchanged.

*Example II.*—For preparation of the powder the same method as in Example I has been applied this time to a solution of iron and cobalt oxalates instead of formates. The ratio iron/cobalt in the solution and in the powder was, as before, equal to 2. The powder was agglomerated under the same conditions.

The density of the bar was 3.7 gr. per cc.

The magnetic characteristics after magnetization without any thermic nor magnetic treatment were:

$$\sigma R = 39$$
$$Hc = 2000$$

these results being fairly the same as those which had been obtained with formates.

*Example III.*—The operation started this time from a solution of iron and cobalt formates in which the ratio iron/cobalt was 6 instead of 2. This solution was treated like that of Example I and a powder was obtained which showed the following values for the magnetization intensity and the coercive force after agglomeration and without any particular thermic or magnetic treatments:

$$\sigma R = 35$$
$$Hc = 1600$$

The coercive force is fairly lower than that which is obtained when the ratio iron/cobalt is equal to 2.

*Example IV.*—For this operation one started from a solution of iron and cobalt acetates in which the ratio iron/cobalt was nearly 2. It was treated in a similar manner as in Example I. The salt, which is less stable than formates and oxalates had become partially ferric.

The characteristic properties on the magnetized bar (without any particular thermic or magnetic treatment) were:

$$\sigma R = 25$$
$$Hc = 1800$$

*Example V.*—As a comparison an experiment was made by preparing a powder which was not according to the invention, by starting this time not from a solution of formates having been caused to precipitate simultaneously, but from a simple pulverulent mixture of iron formate and cobalt formate crystals. The ratio iron/cobalt was about 2. The two kinds of crystals were crushed and intimately mixed together; they were then submitted to a decomposition followed by an oxidation in the same conditions as described in Example I, and the following characteristic properties were obtained on the magnetized bar:

$$\sigma R = 9$$
$$Hc = 327$$

This result, which is much lower than any of the results hereabove obtained, clearly shows the importance of the preparation of the mixture of salts by a precipitation from their solutions and it also shows the surprising improvement which can be afforded by this characteristic feature of the invention.

What I claim is:

1. The method of making permanent magnets, which comprises simultaneously crystallizing ferrous salt and cobalt salt from a common solution containing the same, said salts being decomposable into oxides by heating at a temperature below 600° C., converting the thus obtained salt crystals into their oxides by heating at a temperature below 600° C., agglomerating the oxides to the desired shape at a temperature below 600° C., and magnetizing the agglomerated product.

2. The method of making permanent magnets, which comprises simultaneously crystallizing ferrous salt and cobalt salt from a common solution containing the same, said salts being decomposable into oxides by heating at a temperature below 600° C., drying said salt crystals while protecting them from oxidation, decomposing the crystals into oxides by heating them in a neutral atmosphere at a temperature below 600° C., agglomerating the oxides to the desired shape at a temperature below 600° C., and magnetizing the agglomerated product.

3. The method of making permanent magnets, which comprises simultaneously crystallizing ferrous salt and cobalt salt from a common solution containing the same, said salts being decomposable into oxides by heating at a temperature below 600° C., drying said salt crystals while protecting them from oxidation, converting the thus obtained salt crystals into their oxides by heating at a temperature below 600° C., agglomerating the oxides to the desired shape at a temperature below 600° C., and magnetizing the agglomerated product.

4. A method of making permanent magnets which comprises simultaneously crystallizing ferrous oxalate and cobalt oxalate from a common solution, converting the thus obtained oxalates into oxides by heating at a temperature below 600° C., agglomerating the oxides to the desired shape at a temperature below 600° C., and magnetizing the agglomerated product.

5. A method of making permanent magnets which comprises simultaneously crystallizing ferrous acetate and cobalt acetate from a common solution, converting the thus obtained acetates into oxides by heating at a temperature below 600° C., agglomerating the oxides to the desired shape at a temperature below 600° C., and magnetizing the agglomerated product.

6. A method of making permanent magnets which comprises simultaneously crystallizing ferrous formate and cobalt formate from a common solution, converting the thus obtained formates into oxides by heating at a temperature below 600° C., agglomerating the oxides to the desired shape at a temperature below 600° C., and magnetizing the agglomerated product.

7. The method of making permanent magnets, which comprises simultaneously crystallizing ferrous salt and cobalt salt from a common solution containing the same, said salts being decomposable into oxides by heating at a temperature below 600° C., converting the thus obtained salt crystals into their oxides by heating at a temperature below 600° C., submitting the oxides thus obtained to an extended reheating at a temperature below 400° C. and then agglomerating the oxides to the desired shape at a temperature below 600° C., and magnetizing the agglomerated product.

8. The method of making permanent magnets, which comprises simultaneously crystallizing ferrous salt and cobalt salt from a common solution containing the same, said salts being decomposable into oxides by heating at a temperature below 600° C., converting the thus obtained salt crystals into their oxides by heating at a temperature below 600° C., agglomerating the oxides to the desired shape at a temperature below 600° C., magnetizing the agglomerated product and submitting the said magnetized agglomerated product to an extended reheating below 400° C.

9. The method of making permanent magnets, which comprises simultaneously crystallizing ferrous salt and cobalt salt from a common solution containing the same, said salts being decomposable into oxides by heating at a temperature below 600° C., converting the thus obtained salt crystals into their oxides by heating at a temperature below 600° C., agglomerating the oxides to the desired shape at a temperature below 600° C., and submitting the agglomerated product to an extended reheating in a magnetic field.

LOUIS NÉEL.

REFERENCES CITED

The following references are of record in the file of this patent:

UNITED STATES PATENTS

| Number | Name | Date |
|---|---|---|
| 1,523,109 | Elmen | Jan. 13, 1925 |
| 1,647,737 | Legg | Nov. 1, 1927 |
| 1,946,964 | Cobb | Feb. 13, 1934 |
| 1,976,230 | Kato et al. | Oct. 9, 1934 |